(12) United States Patent
Chou et al.

(10) Patent No.: US 9,706,189 B2
(45) Date of Patent: *Jul. 11, 2017

(54) IMAGE CAPTURING DEVICE AND METHOD FOR CALIBRATING IMAGE DEFECTION THEREOF

(71) Applicant: Altek Semiconductor Corp., Hsinchu (TW)

(72) Inventors: Hong-Long Chou, Hsinchu County (TW); Ming-Jiun Liaw, Miaoli County (TW); Simon Mong-Lun Law, Hsinchu (TW); Ching-Lung Tsai, Hsinchu (TW); Yu-Chih Wang, Tainan (TW)

(73) Assignee: Altek Semiconductor Corp., Hsinchu (TW)

(*) Notice: Subject to any disclaimer, the term of this patent is extended or adjusted under 35 U.S.C. 154(b) by 51 days.

This patent is subject to a terminal disclaimer.

(21) Appl. No.: 14/645,427

(22) Filed: Mar. 12, 2015

(65) Prior Publication Data

US 2015/0215615 A1    Jul. 30, 2015

Related U.S. Application Data

(63) Continuation of application No. 14/304,985, filed on Jun. 16, 2014.

(30) Foreign Application Priority Data

Jan. 28, 2014    (TW) .............................. 103103261 A (51) Int. Cl.
*H04N 5/232* (2006.01)
*H04N 13/02* (2006.01)
(Continued)

(52) U.S. Cl.
CPC ..... *H04N 13/0246* (2013.01); *G02B 13/0015* (2013.01); *G03B 13/36* (2013.01);
(Continued)

(58) Field of Classification Search
CPC ........... H04N 13/02; G03B 3/00; G03B 13/00
See application file for complete search history.

(56) References Cited

U.S. PATENT DOCUMENTS 8,027,582 B2 * 9/2011 Li .......................... G06T 7/0069
348/349
2011/0007135 A1 * 1/2011 Okada .................. G11B 27/322
348/46

* cited by examiner

*Primary Examiner* — Sath V Perungavoor
*Assistant Examiner* — Patricia I Young
(74) *Attorney, Agent, or Firm* — Jianq Chyun IP Office (57) ABSTRACT

A method for calibrating image defection of an image capturing device having a first and second lens, a focusing actuator, and a prestored first focusing step-to-focusing distance relation includes the following steps. A plurality of image sets are captured by the first and second lens, where each of the image sets includes a first and second image, and the images sets include a reference image set. It is detected whether the reference image set is defective. When the reference image set is detected to be defective, the first focusing step-to-focusing distance relation is calibrated according to a focusing step and a focusing distance corresponding to each of the image sets, where the focusing step corresponding to each of the image sets is the number of steps that the focusing actuator is required to move the first and second lens to a focusing position to generate each of the image sets.

6 Claims, 7 Drawing Sheets

(51) Int. Cl.
G02B 13/00 (2006.01)
G06K 9/62 (2006.01)
H04N 17/00 (2006.01)
G03B 13/36 (2006.01)
G03B 43/00 (2006.01)
G06T 7/80 (2017.01)
G06T 7/50 (2017.01)
G06K 9/00 (2006.01)
H04N 13/00 (2006.01)

(52) U.S. Cl.
CPC ........... G03B 43/00 (2013.01); G06K 9/6267 (2013.01); G06T 7/50 (2017.01); G06T 7/80 (2017.01); H04N 5/23212 (2013.01); H04N 13/0239 (2013.01); H04N 13/0296 (2013.01); H04N 17/002 (2013.01); G06K 9/00147 (2013.01); H04N 2013/0081 (2013.01)

IMAGE CAPTURING DEVICE AND METHOD FOR CALIBRATING IMAGE DEFECTION THEREOF

CROSS-REFERENCE TO RELATED APPLICATION

This application is a continuation application of and claims the priority benefit of a prior U.S. application Ser. No. 14/304,985, filed on Jun. 16, 2014, now pending. The prior U.S. application Ser. No. 14/304,985 claims the priority benefit of Taiwan application serial no. 103103261, filed on Jan. 28, 2014. The entirety of each of the above-mentioned patent applications is hereby incorporated by reference herein and made a part of this specification.

BACKGROUND OF THE INVENTION

Field of the Invention

The invention relates to an image capturing device, and more particularly, relates to a method for calibrating image defection of an image capturing device.

Description of Related Art

With development in technology, various smart image capturing devices, such as tablet computers, personal digital assistants and smart phones, have become indispensable tools for people nowadays. Camera lenses equipped in high-end smart image capturing devices provide same or better specifications than those of traditional consumer cameras, and some even provide three-dimensional image capturing features or near-equivalent pixel qualities to those of digital single lens reflex cameras.

Generally, during an autofocusing procedure, an image capturing device may be focused by adjusting positions of lenses through a focusing actuator such as a stepping motor, a voice coil motor (VCM) and so on. Hence, before such image capturing device leaves the factory, a corresponding relation between a focusing distance of a target and a moving step of the focusing actuator may be archived into a conversion table and pre-stored in the image capturing device. Accordingly, when the image capturing device executes the autofocusing procedure on an arbitrary target, the focusing distance of such target may be obtained according to depth information thereof, so that the number of steps that the focusing actuator is required to move may be acquired and the lenses may be adjusted accordingly. However, in practical use, deformation or offset usually occurs on the lenses and the focusing actuator of the image capturing device due to external factors such as drop-offs, bumps, squeezes, changes in temperatures or humidity. The autofocusing procedure may thus cause errors when the image capturing device captures images.

SUMMARY OF THE INVENTION

Accordingly, the invention is directed to an image capturing device and a method for calibrating the image defection thereof, which are capable of detecting whether a deformation or an offset occurs on a first lens, a second lens and a focusing actuator and calibrating the image capturing device at any time, so as to ensure a stable quality of the image capturing device.

The invention proposes a method for calibrating image defection of an image capturing device having first and second lenses, a focusing actuator and a pre-stored first focusing step-to-focusing distance relation, and the method for calibrating image defection includes the following steps. First, a plurality of image sets are captured by utilizing the first lens and the second lens, where each of the image sets includes a first image corresponding to the first lens and a second image corresponding to the second lens. The image sets include a reference image set, and the reference image set includes a first reference image corresponding to the first lens and a second reference image corresponding to the second lens. Next, it is detected whether the reference image set is defective. When the reference image set is detected to be defective, the first focusing step-to-focusing distance relation is calibrated according to a focusing step and a focusing distance corresponding to a focus target in each of the image sets, where the focusing step corresponding to the focus target in each of the image sets is the number of steps that the focusing actuator is required to move the first lens and the second lens to a focusing position for generating each of the image sets.

In an embodiment of the invention, the step of detecting whether the reference image set is defective includes: detecting image coordinates of a feature point respectively on the first reference image and the second reference image of the reference image set; determining whether an offset between the image coordinates of the feature point respectively on the first reference image and the second reference image exceeds a threshold; and if yes, determining that the reference image set is defective.

In an embodiment of the invention, the step of detecting whether the reference image set is defective includes: performing a three-dimensional depth estimation on the first reference image and the second reference image to generate reference depth information of a reference focus target in the reference image set; obtaining a focusing distance corresponding to the reference focus target according to the reference depth information; determining whether a focusing step and the focusing distance corresponding to the reference focus target satisfy the first focusing step-to-focusing distance relation; and if no, determining that the reference image set is defective.

In an embodiment of the invention, the step of detecting whether the reference image set is defective includes: detecting whether the first reference image and the second reference image is out of focus; when at least one of the first reference image and the second reference image is out of focus, determining that the reference image set is defective.

In an embodiment of the invention, when the reference image set is detected to be defective, before the step of calibrating the first focusing step-to-focusing distance relation according to the focusing step and the focusing distance corresponding to the focus target in each of the image sets, the method for calibrating image defection further includes the following steps. A focusing condition of the image capturing device is detected, where the focusing condition includes a far focusing condition and a near focusing condition.

In an embodiment of the invention, when the reference image set is detected to be defective and the focusing condition is the far focusing condition, the step of calibrating the first focusing step-to-focusing distance relation according to the focusing step and the focusing distance corresponding to the focus target in each of the image sets includes: recording the focusing step corresponding to the focus target in each of the image sets; and when the focusing step corresponding to the focus target in each of the image sets reaches a convergent value, obtaining a minimum focusing step in the first focusing step-to-focusing distance relation, and calculating a difference value between the minimum focusing step and the convergent value for calibrating the first focusing step-to-focusing distance relation.

In an embodiment of the invention, when the reference image set is detected to be defective and the focusing condition is the near focusing condition, the step of calibrating the first focusing step-to-focusing distance relation according to the focusing step and the focusing distance corresponding to the focus target in each of the image sets includes: performing a three-dimensional depth estimation on each of the image sets to generate depth information of the focus target in each of the image sets; obtaining the focusing distance corresponding to the focus target in each of the image sets according to each of the depth information; and performing a regression according to the focusing distance and the focusing step corresponding to the focus target in each of the image sets, and calibrating the first focusing step-to-focusing distance relation according to a result of the regression.

In an embodiment of the invention, the step of calibrating the first focusing step-to-focusing distance relation according to the focusing step and the focusing distance corresponding to the focus target in each of the image sets includes: defining the focusing distance and the focusing step corresponding to the focus target in each of the image sets as a data point; categorizing the data points to a plurality of neighboring data groups according to the focusing distances; performing weighted average computation on the data points in each of the data groups to generate a weighted average data point corresponding to each of the neighboring data groups; and performing the regression on the weighted average data points.

The invention also proposes an image capturing device including a first lens, a second lens, a focusing actuator, a storage unit and one or more processing units, where the focusing actuator is coupled to the first lens and the second lens, and the processing unit(s) is coupled to the first lens, the second lens, the focusing actuator, and the storage unit. The storage unit is configured to record a plurality of modules and a first focusing step-to-focusing distance relation. The processing unit is configured to access and execute the modules recorded in the storage unit. The modules include an image capturing module, a focusing module, a defect detection module, and a calibrating module. The image capturing module captures a plurality of image sets by utilizing the first lens and the second lens, where each of the image sets includes a first image corresponding to the first lens and a second image corresponding to the second lens. The image sets include a reference image set, and the reference image set includes a first reference image corresponding to the first lens and a second reference image corresponding to the second lens. The focusing module is configured to control the focusing actuator to move the first lens and the second lens to a focusing position. The defect detection module is configured to detect whether the reference image set is defective. When the defect detection module detects that the reference image set is defective, the calibrating modules calibrates the first focusing step-to-focusing distance relation according to a focusing step and a focusing distance corresponding to a focus target in each of the image sets, where the focusing step corresponding to the focus target in each of the image sets is the number of steps that the focusing actuator is required to move the first lens and the second lens to a focusing position for generating each of the image sets.

In an embodiment of the invention, the defect detection module detects image coordinates of a feature point respectively on the first reference image and the second reference image of the reference image set, determines whether an offset between the image coordinates of the feature point respectively on the first reference image and the second reference image exceeds a threshold, and if yes, the defect detection module determines that the reference image set is defective.

In an embodiment of the invention, the defect detection module performs a three-dimensional depth estimation on the first reference image and the second reference image to generate reference depth information of a reference focus target in the reference image set, obtains a focusing distance corresponding to the reference focus target according to the reference depth information, determines whether a focusing step and the focusing distance corresponding to the reference focus target satisfy the first focusing step-to-focusing distance relation, and if no, the defect detection module determines that the reference image set is defective.

In an embodiment of the invention, the defect detection module detects whether the first reference image and the second reference image are out of focus. When at least one of the first reference image and the second reference image is out of focus, the defect detection module determines that the reference set is defective.

In an embodiment of the invention, the image capturing device further includes a condition detection module configured to detect a focusing condition of the image capturing device, where the focusing condition includes a far focusing condition and a near focusing condition.

In an embodiment of the invention, when the focusing condition is the far focusing condition, the calibrating module records the focusing step corresponding to a focus target in each of the image sets. When the focusing step corresponding to the focus target in each of the image sets reaches a convergent value, the calibrating module obtains a minimum focusing step in the first focusing step-to-focusing distance relation, and calculates a difference value between the minimum focusing step and the convergent value for calibrating the first focusing step-to-focusing distance relation.

In an embodiment of the invention, when the focusing condition is the near focusing condition, the calibrating module performs a three dimensional depth estimation on each of the image sets to generate depth information of the focus target in each of the image sets, obtains the focusing distance corresponding to the focus target in each of the image sets according to each of the depth information, performs a regression according to the focusing distance and the focusing step corresponding to the focus target in each of the image sets, and calibrates the first focusing step-to-focusing distance relation according to a result of the regression.

In an embodiment of the invention, the calibrating module further sets the focusing distance and the focusing step corresponding to the focus target in each of the image sets as a data point, categorizes the data points to a plurality of neighboring data groups according to the focusing distances, performs weighted average computation on the data points in each of the data groups to generate a weighted average data point corresponding to each of the neighboring data groups, and performs the regression on the weighted average data points.

The invention proposes another method for calibrating image defection of an image capturing device having first and second lenses, a focusing actuator and a pre-stored first focusing step-to-focusing distance relation, and the method for calibrating image defection includes the following steps. First, a plurality of image sets are captured by utilizing the first lens and the second lens, where each of the image sets includes a first image corresponding to the first lens and a second image corresponding to the second lens, and where the step of capturing each of the image sets includes utilizing the focusing actuator to move the first lens so as to provide maximum clarity to a focus target in each of the first images. Next, a focusing distance according to depth information of the focus target in each of the first images is obtained. The first focusing step-to-focusing distance relation is calibrated according to a focusing step and the focusing distance corresponding to the focus target in each of the first images, where the focusing step corresponding to the focus target in each of the first images is the number of steps that the focusing actuator moves the first lens and the second lens for generating each of the first images.

In an embodiment of the invention, the step of capturing each of the image sets further comprises utilizing the focusing actuator to move the first lens and the second lens so as to provide maximum clarity to the focus target in each of the image sets, and the method further includes the following steps. First, another focusing distance according to another depth information of the focus target in each of the image sets is obtained. The first focusing step-to-focusing distance relation is calibrated according to another focusing step and the another focusing distance corresponding to the focus target in each of the image sets, where the another focusing step corresponding to the focus target in each of the image sets is the number of steps that the focusing actuator moves the first lens and the second lens for generating each of the image sets.

The invention proposes another image capturing device including a first lens, a second lens, a focusing actuator, a storage unit and one or more processing units, where the focusing actuator is coupled to the first lens and the second lens, and the processing unit(s) is coupled to the first lens, the second lens, the focusing actuator, and the storage unit. The storage unit is configured to record a plurality of modules and a first focusing step-to-focusing distance relation. The processing unit is configured to access and execute the modules recorded in the storage unit. The modules include an image capturing module, a focusing module, a defect detection module, and a calibrating module. The image capturing module captures a plurality of image sets by utilizing the first lens and the second lens, where each of the image sets includes a first image corresponding to the first lens and a second image corresponding to the second lens. The focusing module is configured to control the focusing actuator to move the first lens so as to provide maximum clarity to a focus target in each of the first images. The defect detection module is configured to obtain a focusing distance according to depth information of the focus target in each of the first images. The calibrating module is configured to calibrate the first focusing step-to-focusing distance relation according to a focusing step and the focusing distance corresponding to the focus target in each of the first images, where the focusing step corresponding to the focus target in each of the first images is the number of steps that the focusing actuator moves the first lens for generating each of the first images.

In an embodiment of the invention, the focusing module further controls the focusing actuator to move the first lens and the second lens so as to provide maximum clarity to the focus target in each of the image sets. The defect detection module further obtains another focusing distance according to another depth information of the focus target in each of the image sets. The calibrating module further calibrates the first focusing step-to-focusing distance relation according to another focusing step and the another focusing distance corresponding to the focus target in each of the image sets, where the another focusing step corresponding to the focus target in each of the image sets is the number of steps that the focusing actuator moves the first lens and the second lens for generating each of the image sets.

Based on the image capturing device and the method for calibrating the image defection thereof as proposed by the invention, when a deformation or an offset occurs on a first lens, a second lens and the focusing actuator of the image capturing device, the image capturing module is capable of calibrating the first focusing step-to-focusing distance relation pre-stored in the image capturing device according to the focusing distance corresponding to the focus target in each of the image sets captured by the first lens and the second lens as well as the focusing step that the focusing actuator is required to move the first lens and the second lens to the focusing position. The image capturing device and the method for calibrating the image defection thereof as proposed in the invention may allow for a simple and quick automatic calibration on the image capturing device without even being noticed by the user when a plurality of image sets are captured by the image capturing module, so as to ensure a stable quality of the image capturing device and enhance user experience.

To make the above features and advantages of the disclosure more comprehensible, several embodiments accompanied with drawings are described in detail as follows.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the present invention.

Figure 1:
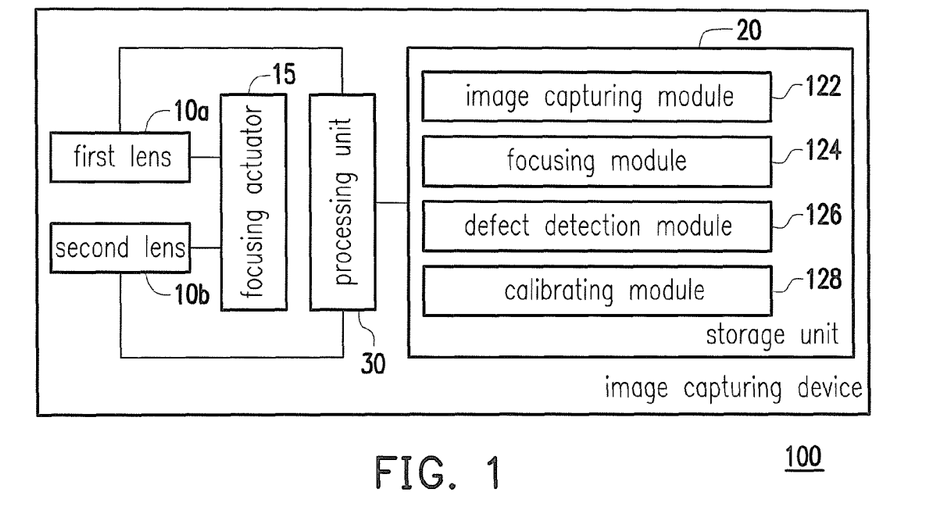
FIG. 1 is a block diagram illustrating an image capturing device according to an embodiment of the invention.

FIG. 1 is a block diagram illustrating an image capturing device according to an embodiment of the invention. It should, however, be noted that this is merely an illustrative example and the present invention is not limited in this regard. All components of the image capturing device and their configurations are first introduced in FIG. 1. The detailed functionalities of the components are disclosed along with FIG. 2.

Referring to FIG. 1, an image capturing device 100 includes a first lens 10a, a second lens 10b, a focusing actuator 15, a storage unit 20 and one or more processing units 30. In the present embodiment, the image capturing device 100 is, for example, a digital camera, a digital camcorder, a digital single lens reflex camera or other devices provided with an image capturing feature such as a smart phone, a tablet computer, a personal digital assistant, a head mount display, and so on. The invention is not limited herein.

Each of the first lens 10a and the second lens 10b includes optical sensing elements for sensing light intensity entering the first lens 10a and the second lens 10b respectively, so as to generate a first image and a second image. The optical sensing elements are, for example, charge-coupled-device (CCD) elements, complementary metal-oxide semiconductor (CMOS) elements, and yet the invention is not limited thereto.

The focusing actuator 15 is coupled to the first lens 10a and the second lens 10b. The focusing actuator 15 may be, for example, a stepping motor, a voice coil motor (VCM), a piezoelectric actuator, or other actuators capable of mechanically moving the first lens 10a and the second lens 10b for focusing, and yet the invention is not limited herein.

The storage unit 20 may be one or a combination of a stationary or mobile random access memory (RAM), a read-only memory (ROM), a flash memory, a hard drive or other similar devices. The storage unit 20 is configured to record a plurality of modules executable by the processing unit 30, where the modules may be loaded into the processing unit 30 for calibrating the image capturing device 100.

The processing unit 30 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices. The processing unit 30 is coupled to the first lens 10a, the second lens 10b, the focusing actuator 15 and the storage unit 20, and capable of accessing and executing the modules recorded in the storage unit 20 for calibrating the image capturing device 100.

The modules include an image capturing module 122, a focusing module 124, a defect detection module 126 and a calibrating module 128 and may be loaded into the processing unit 30 for calibrating the image capturing device 100. The detailed steps of calibrating the image capturing device 100 are illustrated in the embodiments hereinafter.

Figure 2:
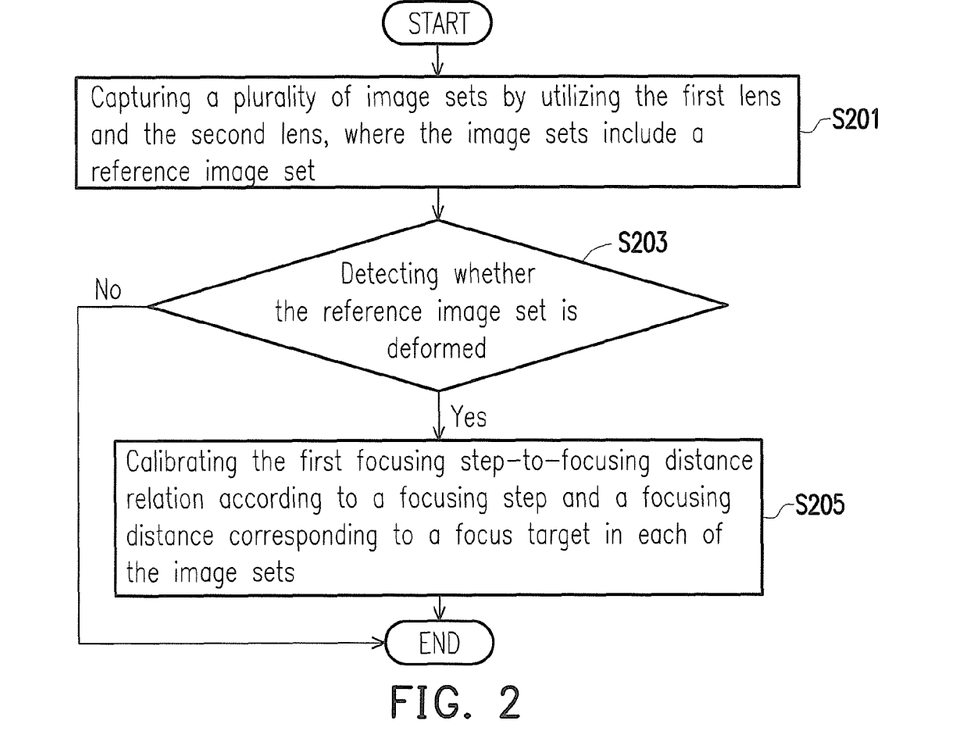
FIG. 2 is a flowchart illustrating a method for calibrating image deformation of the image capturing device according to an embodiment of the invention.

FIG. 2 is a flowchart illustrating a method for calibrating image deformation of an image capturing device according to an embodiment of the invention, and the method for calibrating image deformation of the image capturing device of FIG. 2 may be implemented by the elements in the image capturing device 100 of FIG. 1.

Referring to both FIG. 1 and FIG. 2, the image capturing module 122 captures a plurality of image sets by utilizing the first lens 10a and the second lens 10b, where the image sets include a reference image set (step S201). The first lens 10a and the second lens 10b may capture the image sets with the same parameters, where the parameters include focal lengths, apertures, shutters, and so on, which are not particularly limited in the invention. The image sets captured by the image capturing module 122 are, for example, a plurality of preview image sets, and each of the image sets includes a first image corresponding to the first lens 10a and a second image corresponding to the second lens 10b. One of the image sets (i.e., the aforementioned reference image set) will be described hereafter. The reference image set includes a first reference image corresponding to the first lens 10a and a second reference image corresponding to the second lens 10b.

Next, the defect detection module 126 detects whether the reference image set is deformed (step S203). The defect detection module 126 may determine whether the reference image set is deformed according to an offset of an arbitrary feature point of the reference image set or a three-dimensional depth estimation on the reference image set, and yet the invention is not limited thereto.

To be specific, in one embodiment, the defect detection module 126 may detect the arbitrary feature point of the reference image set according to a conventional feature detection algorithm, and determine whether the offset between image coordinates of the feature point respectively on the first reference image and the second reference image exceeds a threshold, so as to detect whether the reference image set is deformed. In the present embodiment, after the defect detection module 126 detects the feature point, it may determine whether a vertical offset (i.e., a difference in Y-axis coordinate) between the image coordinates of the feature point respectively on the first reference image and the second reference image exceeds the threshold. When the defect detection module 126 determines that the offset between the image coordinates of the feature point of the reference image set does not exceed the threshold, it indicates that the reference image set is not deformed. The image capturing device 100 may end the method for calibrating image deformation. Otherwise, when the defect detection module 126 determines that the offset between the image coordinates of the feature point of the reference image set exceeds the threshold, it indicates that the reference image set is deformed, and the image capturing device 100 may continue to execute the method for calibrating image deformation.

From another perspective, before the reference image set is captured by the image capturing module 122, the focusing module 124 may control the focusing actuator 15 to move the first lens 10a and the second lens 10b to a focusing position by applying an autofocusing technique such as a hill-climbing algorithm, so as to adjust a distance between the first lens 10a and an object and a distance between the second lens 10b and the object, so as to obtain the capturing object with a maximum resolution. The object with the maximum resolution in the reference image set may be referred to as a "reference focus target." In the present embodiment, the defect detection module 126 may determine whether the reference image set is deformed according to depth information of the reference focus target. More specifically, the defect detection module 126 may process the reference image set through a stereo vision technique to obtain the depth information of the reference focus target in a spatial domain, and obtain an object distance of the reference focus target (i.e., a focusing distance of the reference focus target) according to the depth information.

It should be noted that, the closer the object is to the image capturing device 100, the greater the number of steps that the focusing actuator 15 is required to move the first lens 10a and the second lens 10b to the focusing position is greater; the farther the object is from the image capturing device 100, the less the number of steps that the focusing actuator 15 is required to move the first lens 10a and the second lens 10b to the focusing position. Therefore, there exists a corresponding relation between the focusing distance of the capturing object and the number of steps to be moved by the focusing actuator 15, and such corresponding relation is referred to as a "first focusing step-to-focusing distance relation." The first focusing step-to-focusing distance relation may be pre-stored in the storage unit 20 as a look-up table (LUT), where an input index of the look-up table is a focusing distance, and an output of the look-up table is a focusing step. However, when deformation or offset occurs on the first lens 10a, the second lens 10b and the focusing actuator 15, the first focusing step-to-focusing distance relation pre-stored in the storage unit 20 becomes unreliable.

Accordingly, the defect detection module 126 may determine whether the focusing step and the focusing distance corresponding to the reference focus target satisfy the first focusing step-to-focusing distance relation pre-stored in the storage unit 20. In other words, the defect detection module 126 may determine whether the focusing distance obtained according to the depth information and the number of steps that the focusing module 124 is required to move the first lens 10a and the second lens 10b for obtaining the reference image set satisfy the first focusing step-to-focusing distance relation. When the defect detection module 126 determines that the focusing step and the focusing distance corresponding to the reference focus target satisfy the first focusing step-to-focusing distance relation, it indicates that the reference image set is deformed, and the image capturing device 100 may end the method for calibrating image deformation. Otherwise, when the defect detection module 126 determines that the focusing step and the focusing distance corresponding to the reference focus target do not satisfy the first focusing step-to-focusing distance relation, it indicates that the reference image set is deformed, and the image capturing device 100 may continue to execute the method for calibrating image deformation.

When the defect detection module 126 detects that the reference image set is deformed, the calibrating module 128 calibrates the first focusing step-to-focusing distance relation according to a focusing step and a focusing distance corresponding to a focus target in each of the image sets (step S205), so as to complete the calibration process. Herein, the calibrating module 128 may calibrate the first focusing step-to-focusing distance relation according to images with different focusing distances. Detailed steps regarding the above will be described along with embodiments hereafter.

Figure 3:
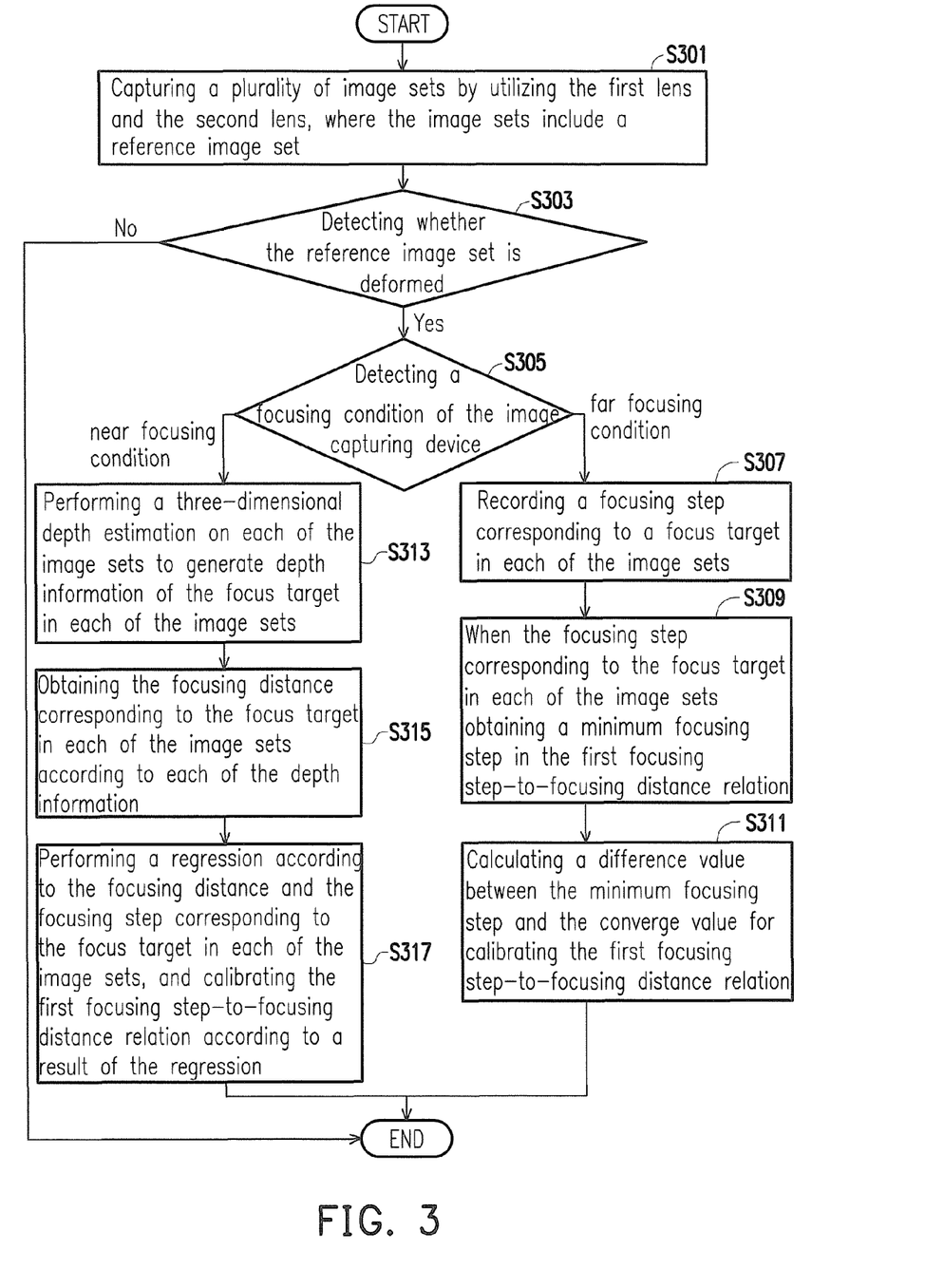
FIG. 3 is a flowchart illustrating a method for calibrating image deformation of the image capturing device according to an embodiment of the invention.

FIG. 3 is a flowchart illustrating a method for calibrating image deformation of the image capturing device according to an embodiment of the invention. In the present embodiment, the image capturing device 100 further includes a condition detection module (not shown), configured to detect a focusing condition of the image capturing device 100 for calibrating the first focusing step-to-focusing distance relation in different manners.

Referring to both FIG. 1 and FIG. 3, first, the image capturing module 122 captures a plurality of image sets by utilizing the first lens 10a and the second lens 10b, where the image sets include a reference image set (step S301). Next, the defect detection module 126 detects whether the reference image set is deformed (step S303). Descriptions for step S301 and step S303 may refer to the related descriptions in step S201 and step S203, which may not be repeated hereinafter. When the defect detection module 126 detects that the reference image set is deformed, the image capturing device 100 may end the method for calibrating image deformation. Otherwise, when the defect detection module 126 detects that the image deformation occurs on the reference image set, the condition detection module detects a focusing condition of the image capturing device 100 (step S305). Herein, the focusing condition includes a far focusing condition and a near focusing condition. To be specific, when the image capturing module 122 obtains, for example, a plurality of preview image sets by utilizing the first lens 10a and the second lens 10b, the condition detection module may detect whether content of the image sets captured by the image capturing device 100 is a far-scene image or a near-scene image. For example, the far scene may be an outdoor scene, and the near scene may be an indoor scene. The condition detection module may detect the brightness of an ambient light source, recognize a scene of image content by leveraging a pattern recognition algorithm, or use the parameters adopted by the first lens 10a and the second lens 10b for determining the focusing condition, and yet the invention is not limited thereto.

When the condition detection module determines that the focusing condition is the far focusing condition, the calibrating module 128 records the focusing step corresponding to a focus target in each of the image sets (step S307). To be specific, because each the image sets captured is captured by the image capturing module 122 under the far focusing condition, an object with a maximum resolution (referred to as a "focus object") in each of the image sets is located at an infinity position with respect to the first lens 10a and the second lens 10b. In the present embodiment, the infinity position may be a position that is more than 5 meters away from the first lens 10a and the second lens 10b. The calibrating module 128 records the number of steps that the image capturing module 122 is required to move the first lens 10a and the second lens 10b for capturing the image with an infinity focusing distance.

When the focusing step corresponding to the focus target in each of the image sets reaches a convergent value, the calibrating module 128 obtains a minimum focusing step in the first focusing step-to-focusing distance relation (step S309), and calculates a difference value between the minimum focusing step and the convergent value for calibrating the first focusing step-to-focusing distance relation (step S311). To be specific, within a range of the focusing distance, a negative linear relationship is found in the first focusing step-to-focusing distance relation. When the focusing step corresponding to each of image sets with the far-scene image captured by image capturing module 122 converges to a minimum value, said convergent value represents the number of steps that the focusing actuator 15 is required to move for focusing the focus object at the infinity position. Subsequently, the calibrating module 128 may obtain a minimum focusing step in the first focusing step-to-focusing distance relation, and calibrate the first focusing step-to-focusing distance relation according to the difference value between the minimum focusing step and the convergent value.

For instance, Table 1 lists numbers of steps that focusing actuator 15 is required to move in order to capture ten sets of the far-scene image.

TABLE 1

| Image Sets | 1 | 2 | 3 | 4 | 5 | 6 | 7 | 8 | 9 | 10 |
|---|---|---|---|---|---|---|---|---|---|---|
| Focusing Step | 308 | 310 | 300 | 303 | 307 | 301 | 303 | 300 | 301 | 300 |

In Table 1, the corresponding focusing steps of all the ten far-scene image sets captured by the image capturing module 122 converge to 300; namely, the convergent value is 300. The calibrating module 128 may calibrate the first focusing step-to-focusing distance relation by such convergent value.

Figure 4:
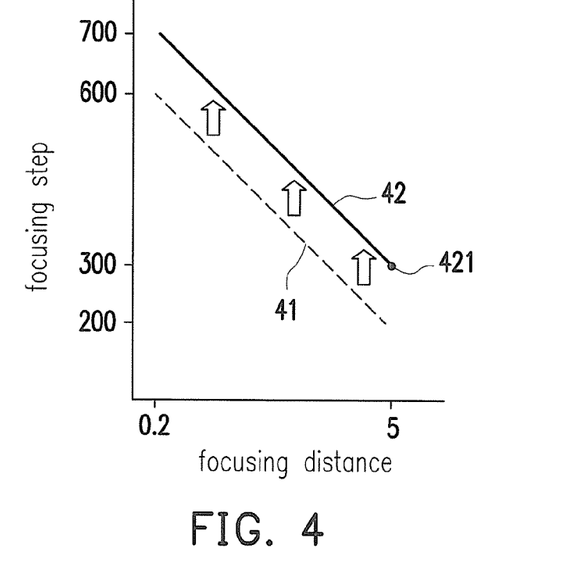
FIG. 4 illustrates a schematic diagram of calibrating the first focusing step-to-focusing distance relation according to an embodiment of the invention.

FIG. 4 illustrates a schematic diagram of calibrating the first focusing step-to-focusing distance relation according to an embodiment of the invention.

Referring to FIG. 4, a straight line 41 represents a first focusing step-to-focusing distance relation with the focusing distance ranged from 0.2 meter to 5 meters, where the focusing step corresponding to the focusing distance of 0.2 meter is 600, and the focusing step corresponding to the focusing distance of 5 meters is 200. In other words, in the present embodiment, the minimum focusing step is 200. In the example of Table 1, since the focusing step corresponding to the image sets with the far-scene image captured by the image capturing module 122 converges to 300, the calibrating module 128 may determine that the focusing step is a focusing step corresponding to the focusing distance of 5 meters, which may be represented by a point 421. The calibrating module 128 may calibrate the first focusing step-to-focusing distance relation according to a shortest distance between the point 421 and the straight line 41. In brief, the shortest distance is a difference value between the minimum focusing step and the convergent value in the Y-axis direction, and the calibrating module 128 may calibrate the first focusing step-to-focusing distance relation according to the difference value.

Take FIG. 4 as an example, the calibrating module 128 may shift the straight line 41 towards Y-axis in the positive direction, so that the straight line 41 is moved upwardly until overlapping with the point 421. A final position of the straight line 41 is where a straight line 42 is located, where the straight line 42 represents a new focusing step-to-focusing distance relation. The calibrating module 128 may replace the first focusing step-to-focusing distance relation pre-stored in the storage unit 20 with the new focusing step-to-focusing distance relation to complete the calibration process.

When the condition detection module determines that the focusing condition is the near focusing condition, the calibrating module 128 performs a three-dimensional depth estimation on each of the image sets to generate depth information of the focus target in each of the image sets (step S313), and obtains the focusing distance corresponding to the focus target in each of the image sets according to each of the depth information (step S315). More specifically, the calibrating module 28 may process each of the image sets through the stereo vision technique to obtain the depth information of the focus target in each of the image sets in a spatial domain, and obtain an object distance of the focus target (i.e., a focusing distance of the focus target) according to the depth information.

Next, the calibrating module 128 performs a regression according to the focusing distance and the focusing step corresponding to the focus target in each of the image sets as well as calibrates the first focusing step-to-focusing distance relation according to a result of the regression calculation (step S317). In other words, the calibrating module 128 may perform a regression analysis on multiple sets of the focusing distance and the focusing step being collected. In the present embodiment, because a negative linear relationship is found in the first focusing step-to-focusing distance relation, the calibrating module 128 may fit a linear regression model to find a fitted regression line of the sets of the focusing distance and the focusing step for replacing the first focusing step-to-focusing distance relation.

Figure 5A:
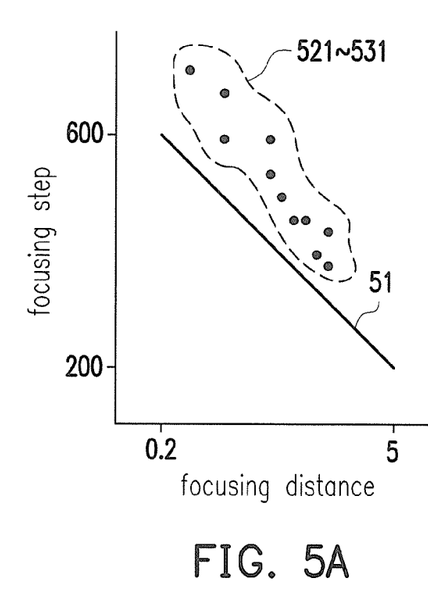
FIGS. 5A-5D illustrate schematic diagrams of calibrating the first focusing step-to-focusing distance relation according to an embodiment of the invention.
Figure 5B:
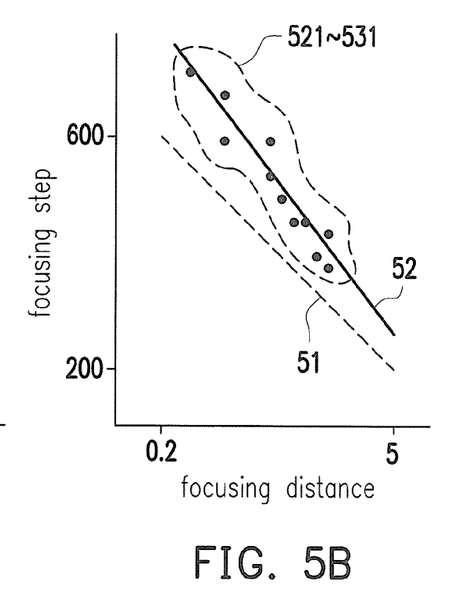

For instance, FIG. 5A and FIG. 5B illustrate schematic diagrams of calibrating the first focusing step-to-focusing distance relation according to an embodiment of the invention. Referring to FIG. 5A, a straight line 51 represents a first focusing step-to-focusing distance relation with the focusing distance ranged from 0.2 meter to 5 meters, where the focusing step corresponding to the focusing distance of 0.2 meter is 600, and the focusing step corresponding to the focusing distance of 5 meters is 200. After eleven image sets are captured by the image capturing module 122, focusing distances and focusing steps of the eleven image sets are represented by points 521 to 531. In the present embodiment, the calibrating module 128 may perform a regression analysis on the points 521 to 531 by fitting a least square regression model. However, in other embodiment, the calibrating module 128 may perform the regression analysis by fitting other linear regression models. The invention is not limited herein. A fitted regression line computed by the calibrating module 128 after performing the regression analysis on the points 521 to 531 is a straight line 52 as illustrated in FIG. 5B, which represents a new focusing step-to-focusing distance relation.

In another embodiment, assume that the focusing distance and the focusing step corresponding to the focus target in each of the image may be as a data point. Before the calibrating module 128 performs regression, it may perform data clustering on the neighboring data points according to the focusing distances so as to categorize the data points to a plurality of neighboring data groups. Next, the calibrating module 128 may perform regression on the neighboring data groups and accordingly calculate a fitted regression line.

Figure 5C:
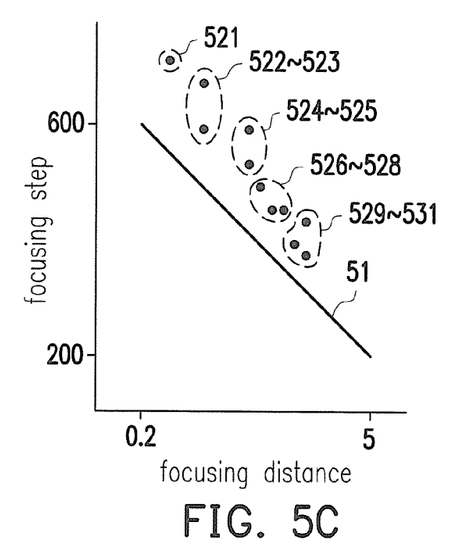
Figure 5D:
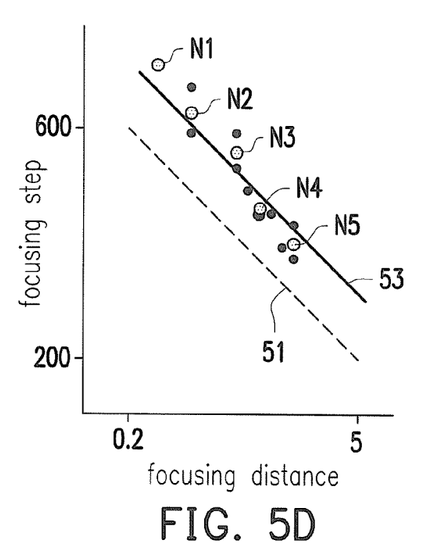

For example, FIG. 5C and FIG. 5D illustrate schematic diagrams of calibrating the first focusing step-to-focusing distance relation according to an embodiment of the invention. Referring to FIG. 5C, in the present embodiment, before the calibrating module 128 performs regression analysis, it may categorize points 521-531 into five groups, i.e., the point 521, the points 522-523, the points 524-525, the points 526-528, and the points 529-531. Referring to FIG. 5D, the calibrating module 128 may perform weighted average computation on the data points in the five groups to generate a weighted average data point belonging to each of the five groups, i.e., N1-N5. A fitted regression line computed by the calibrating module 128 after performing the regression analysis on the points N1-N5 is a straight line 53 as illustrated in FIG. 5D, where the straight line 53 corresponds to a new focusing step-to-focusing distance relation.

Next, the calibrating module 128 may then replace the first focusing step-to-focusing distance relation pre-stored in the storage unit 20 with the new focusing step-to-focusing distance relation to complete the calibration process.

Additionally, in another embodiment, when the image capturing unit 122 captures the image sets under both of the far focusing condition and the near focusing condition, the calibrating module 128 may first execute steps S313 to S317 for the images captured under the near focusing condition to calibrate the first focusing step-to-focusing distance relation, and then execute steps S307 to S311 for the images captured under the far focusing condition to further calibrate the new focusing step-to-focusing distance relation for a more precise result. In another embodiment, the calibrating module 128 may first execute steps S307 to S311 for the images captured under the far focusing condition to calibrate the first focusing step-to-focusing distance relation, and then execute steps S313 to S317 for the images obtained under the near focusing condition to further calibrate the new focusing step-to-focusing distance relation. The invention is not limited to the above.

Figure 6:
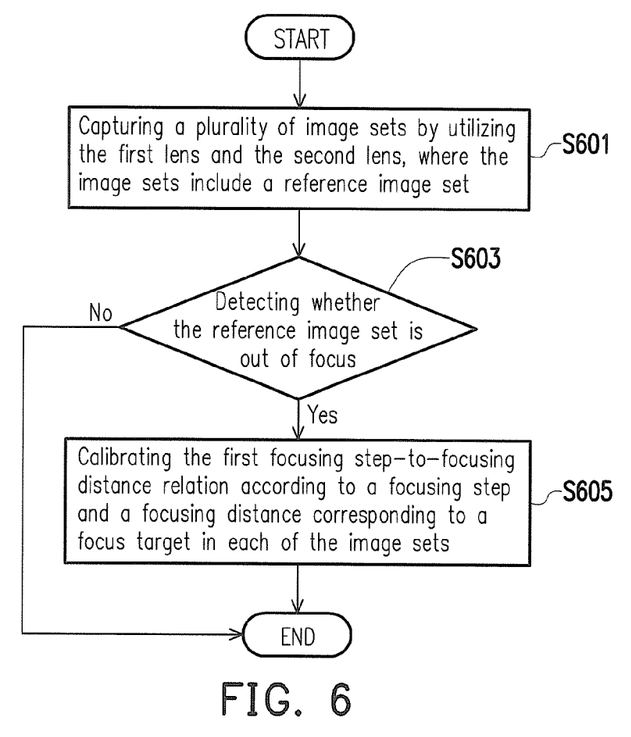
FIG. 6 is a flowchart illustrating a method for calibrating image defocus of the image capturing device according to an embodiment of the invention.

FIG. 3 and FIG. 4. mainly focus on performing calibration due to image deformation. In another embodiment, when images are out of focus due to distortion or displacement of the focusing actuator 15, another calibration may be performed on the image capturing device based on a method for calibrating image defocus of an image capturing device according to an embodiment of the invention as illustrated in FIG. 6. The method for calibrating image defocus of an image capturing device is also adapted to the image capturing device as illustrated in FIG. 1.

Referring to both FIG. 1 and FIG. 6, first, the image capturing module 122 captures a plurality of image sets by utilizing the first lens 10a and the second lens 10b, where the image sets include a reference image set (step S601). Descriptions for step S601 may refer to the related descriptions in step S201, which may not be repeated hereinafter.

Next, the defect detection module 126 detects whether the reference image set is out of focus (step S603). To be specific, similar to the embodiment in FIG. 2, before the image capturing module 122 captures the reference image set, the focusing module 124 has already moved the first lens 10a and the second lens 10b to a focusing position by using the focusing actuator 15 through an autofocusing technique so as to adjust the distance between an object and the first lens 10a as well as the second lens 10b. However, when the focusing actuator 15 is distorted or displaced, the first focusing step-to-focusing distance relation prestored in the storage unit 20 is not reliable so that the reference image set captured by the image capturing module 122 may be out of focus (e.g., blur).

Accordingly, the defect detection module 126 may, for example, determine whether the first reference image and the second reference image in the reference image set satisfy a clarity condition so as to determine whether the reference image set is out of focus or in focus. In the present embodiment, the clarity condition may be determined by image clarity information (e.g., clarity values) based on sharpness or contrast of an image or obtained via edge detection, and yet the invention is not limited herein. The defect detection module 126 may determine whether the clarity values of the first reference image and the second reference image are greater than a predetermined clarity value. When both of the first reference image and the second reference image are greater than the predetermined clarity vale (i.e., both images satisfy the clarity condition), it indicates that the reference image set is not out of focus, and the image capturing device 100 may end the flow for calibrating image defocus.

When at least one of the first reference image and the second reference image is out of focus, the defect detection module 126 would determine that the reference image set is out of focus, and the calibrating module 128 would calibrate the first focusing step-to-focusing distance relation according to a focusing step and a focusing distance corresponding to a focus target in each of the image sets (step S605), so as to complete the calibration process. The detailed steps for calibrating the first focusing step-to-focusing distance relation in Step S605 may refer to the related description in Step S307-317 of FIG. 3 and may not be repeated herein.

Figure 7:
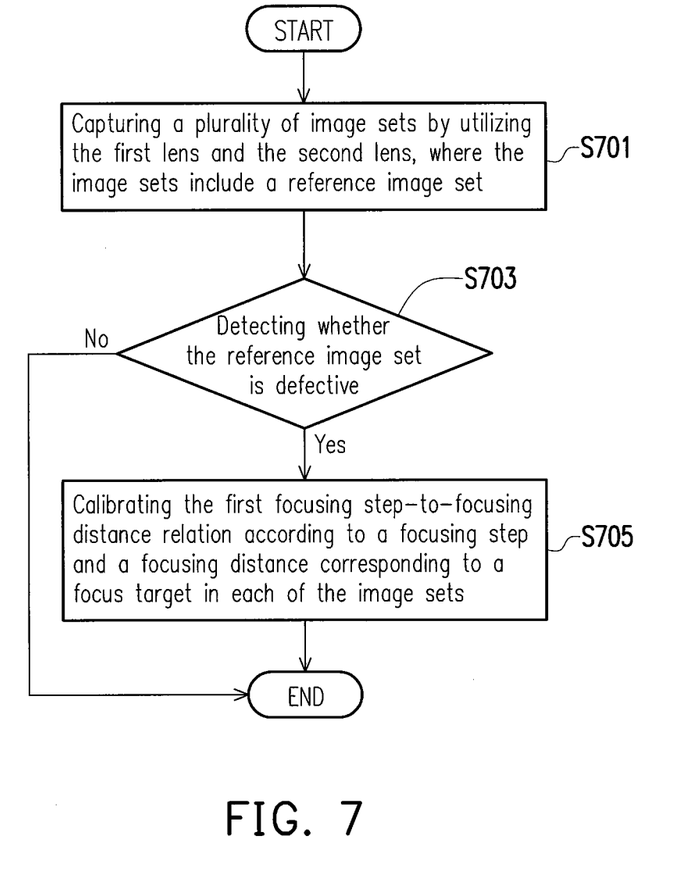
FIG. 7 is a flowchart illustrating a method for calibrating image defection of the image capturing device according to an embodiment of the invention.

The method for calibrating image deformation and image defocus as illustrated in FIG. 2 and FIG. 6 may be integrated into a method for calibrating image defection of an image capturing device according to an embodiment in the invention as illustrated in FIG. 7.

Referring to FIG. 7, first, the image capturing module 122 captures a plurality of image sets by utilizing the first lens 10a and the second lens 10b, where the image sets include a reference image set (step S701). Descriptions for step S701 may refer to the related descriptions in step S201, which may not be repeated hereinafter.

Next, the defect detection module 126 detects whether the reference image set is defective (step S703). That is, the defect detection module 126 may determine whether the reference image set is defective due to distortion or displacement of the first lens 10a, the second lens 10b, or the focusing actuator 15. The detailed steps may refer to the related description in FIG. 2 and FIG. 6 and may not be repeated herein.

When at least one of the first reference image and the second reference image is defective, the defect detection module 126 would determine that the reference image set is out of focus, and the calibrating module 128 would calibrate the first focusing step-to-focusing distance relation according to a focusing step and a focusing distance corresponding to a focus target in each of the image sets (step S705), so as to complete the calibration process. The detailed steps for calibrating the first focusing step-to-focusing distance relation in Step S705 may refer to the related description in Step S307-317 of FIG. 3 and may not be repeated herein.

Figure 8:
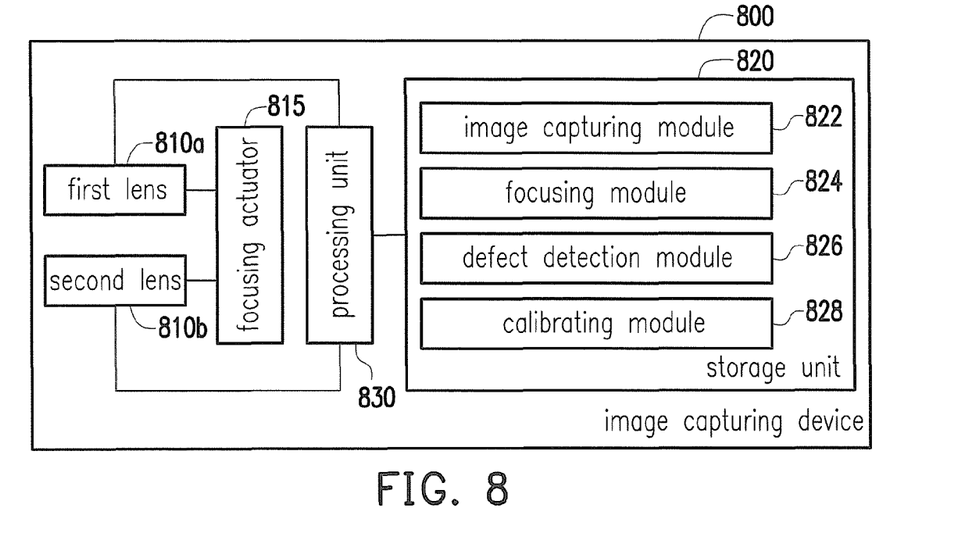
FIG. 8 is a block diagram illustrating an image capturing device according to another embodiment of the invention.

FIG. 8 illustrates a block diagram of another image capturing device according to an embodiment of the invention.

Referring to FIG. 8, an image capturing device 800 includes a first lens 810a, a second lens 810b, a focusing actuator 815, a storage unit 820, and one or more processing units 830, where the features of the first lens 810a, the second lens 810b, the focusing actuator 815, the storage unit 820, and the processing unit 830 are similar to the first lens 10a, the second lens 10b, the focusing actuator 15, the storage unit 120, and the processing unit 130 as illustrated in FIG. 1 and may not be repeated herein.

In the present embodiment, the storage unit 820 stores an image capturing module 822, a focusing module 824, a defect detection module 826, and a calibrating module 828. The method for calibrating image defection of the image capturing device of FIG. 8 would be illustrated in the embodiment hereafter.

Figure 9:
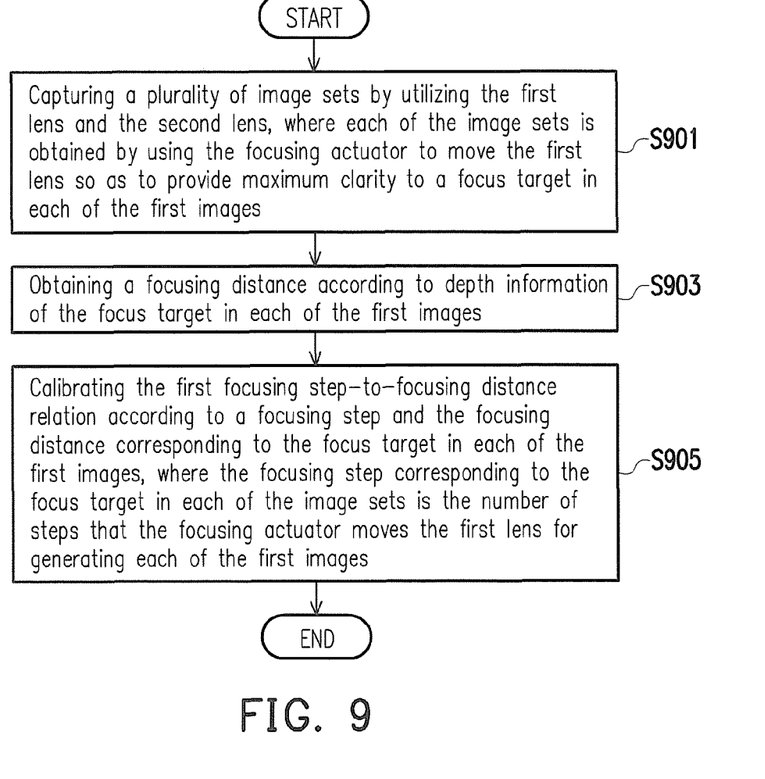
FIG. 9 is a flowchart illustrating a method for calibrating image defection of the image capturing device according to an embodiment of the invention.

FIG. 9 and FIG. 9 are flowcharts illustrating two methods of calibrating image defection of an image capturing device. The methods for calibrating image defection of the image capturing device of FIG. 9 and FIG. 10 may be both implemented by the elements in the image capturing device 800 of FIG. 8.

In the embodiment illustrated in FIG. 9, the focusing actuator 815 would only move the first lens 810a during a focusing procedure. In other words, the first lens 810a may be a zoom lens, and the second lens 810b may be a prime lens. Referring to FIG. 8 and FIG. 9, first, the image capturing module 122 captures a plurality of image sets by utilizing the first lens 810a and the second lens 810b, where the step of capturing each of the image sets includes utilizing the focusing actuator 815 to move the first lens 810a so as to provide maximum clarity to a focus target in each of the first images (Step S901). Next, the defect detection module 826 obtains a focusing distance according to depth information of the focus target in each of the first images (Step S903). The calibrating module 828 calibrates the first focusing step-to-focusing distance relation according to a focusing step and the focusing distance corresponding to the focus target in each of the first images, where the focusing step corresponding to the focus target in each of the image sets is the number of steps that the focusing actuator moves the first lens 801a for generating each of the first images (Step S905). The detailed steps of obtaining the images including the focus target with maximum clarity by the image capturing modules 822, obtaining the focusing distance by the defect detection module 826 according to the depth information of the focus target, and calibrating first focusing step-to-focusing distance relation by the calibrating module 828 may refer to the related descriptions of the image capturing device 100 and may not be repeated herein. The difference is that the second lens 810b is fixed, and thus only the focusing distances and the depth information corresponding to the first images would be used for calibration.

Figure 10:
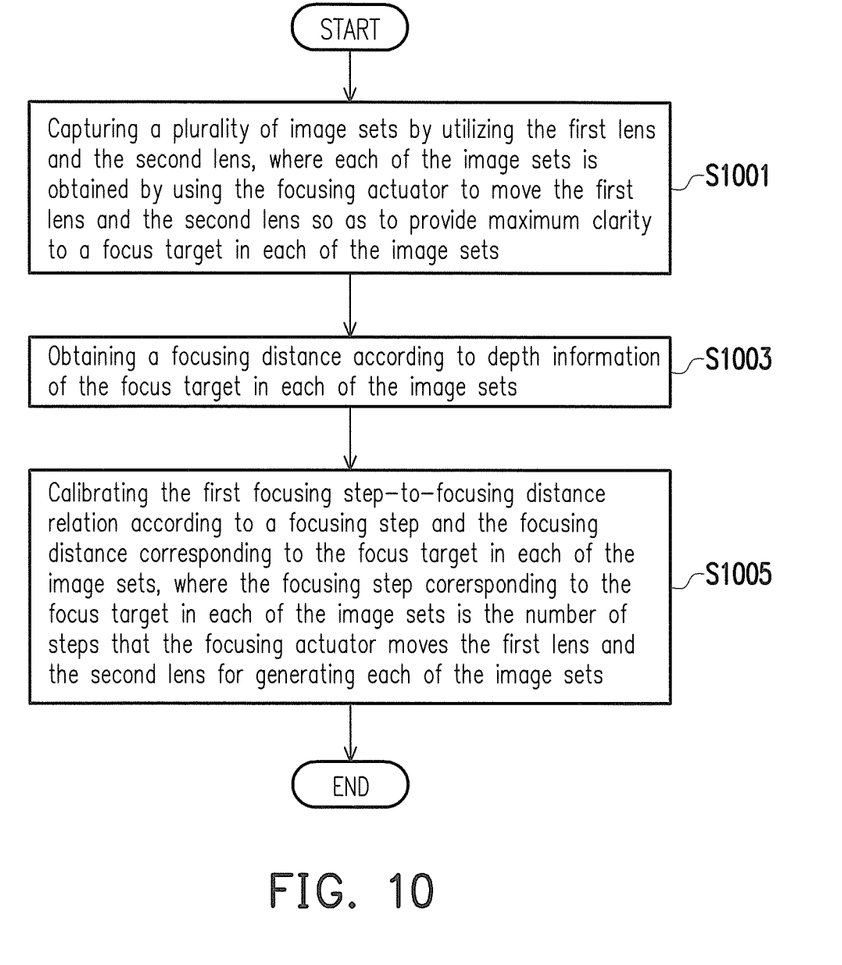
FIG. 10 is a flowchart illustrating another method for calibrating image defection of the image capturing device according to an embodiment of the invention.

On the other hand, in the embodiment illustrated in FIG. 10, the focusing actuator 815 would move both the first lens 810a and the second lens 810b during a focusing procedure. Referring to both FIG. 8 and FIG. 10, first, the image capturing module 122 captures a plurality of image sets by utilizing the first lens 810a and the second lens 810b, where the step of capturing each of the image sets includes utilizing the focusing actuator 815 to move the first lens 810a and the second lens 810b so as to provide maximum clarity to a focus target in each of the image sets (Step S1001). Next, the defect detection module 826 obtains a focusing distance according to depth information of the focus target in each of the image sets (Step S1003). The calibrating module 828 calibrates the first focusing step-to-focusing distance relation according to a focusing step and the focusing distance corresponding to the focus target in each of the image sets, where the focusing step corresponding to the focus target in each of the image sets is the number of steps that the focusing actuator moves the first lens and the second lens for generating each of the image sets (Step S1005). The detailed steps of obtaining the images including the focus target with maximum clarity by the image capturing modules 822, obtaining the focusing distance by the defect detection module 826 according to the depth information of the focus target, and calibrating first focusing step-to-focusing distance relation by the calibrating module 828 may refer to the related descriptions of the image capturing device 100 and may not be repeated herein.

In summary, according to the image capturing device and the method for calibrating the image defection thereof as proposed by the invention, when a deformation or an offset occurs on a first lens, a second lens and the focusing actuator of the image capturing device, the image capturing module is capable of calibrating the first focusing step-to-focusing distance relation pre-stored in the image capturing device according to the focusing distance corresponding to the focus target in each of the image sets captured by the first lens and the second lens as well as the focusing step that the focusing actuator is required to move the first lens and the second lens to the focusing position. The image capturing device and the method for calibrating the image defection thereof as proposed in the invention may allow for a simple and quick automatic calibration on the image capturing device without even being noticed by the user, so as to ensure a stable quality of the image capturing device and enhance user experience.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for calibrating image defection, adapted to an image capturing device having a first lens, a second lens, a focusing actuator, and a pre-stored first focusing step-to-focusing distance relation ratio, comprising:
    capturing a plurality of image sets by utilizing the first lens and the second lens, wherein each of the image sets comprises a first image corresponding to the first lens and a second image corresponding to the second lens, and the image sets comprise a reference image set including a first reference image corresponding to the first lens and a second reference image corresponding to the second lens;
    detecting whether the reference image set is out of focus by determining whether clarity values of the first reference image and the second reference image are not greater than a predetermined clarity value, wherein the reference image set is detected out of focus when at least one of the first reference image and the second reference image is out of focus; and
    when the reference image set is detected to be out of focus and when a focusing condition of the image capturing device is a far focusing condition:
    recording a focusing step corresponding to a focused target in each of the image set, wherein the focusing step corresponding to the focused target in each of the image sets is a number of steps that the focusing actuator is required to move the first lens and the second lens to a focusing position to provide maximum clarity to a focused target in each of the image sets;
    when the focusing step corresponding to the focused target in each of the image sets reaches a convergent value, obtaining a minimum focusing step and calculating a difference value between the minimum focusing step and the convergent value; and
    calibrating the first focusing step to focusing distance ratio according to the difference value; and
    when the reference image set is detected to be deformed and when a focusing condition of the image capturing device is a near focusing condition:
    performing a three-dimensional depth estimation on each of the image sets to generate depth information of the focused target in each of the image sets;
    obtaining the focusing distance corresponding to the focused target in each of the image sets according to each of the depth information;
    performing a regression according to the focusing distance and the focusing step corresponding, to the focused target in each of the image sets; and
    calibrating the first focusing step-to-focusing distance ratio according to a result of the regression.

2. The method for calibrating image defection of claim 1, wherein the step of calibrating the first focusing step-to-focusing distance relation ratio according to the focusing step and the focusing distance corresponding to the focused target in each of the image sets comprises:

setting the focusing distance and the focusing step corresponding to the focused target in each of the image sets as a data point;
categorizing the data points into a plurality of neighboring data groups according to the focusing distances;
performing weighted average computation on the data points in each of the data groups to generate a weighted average data point corresponding to each of the neighboring data groups; and
performing the regression on the weighted average data points.

3. An image capturing device, comprising:
a first lens;
a second lens;
a focusing actuator, coupled to the first lens and the second lens;
a storage unit, recording a plurality of modules and a first focusing step-to-focusing distance relation ratio; and
one or more processing units, coupled to the first lens, the second lens, the focusing actuator and the storage unit, and accessing and executing the modules recorded in the storage unit, wherein the modules comprise:
an image capturing module, capturing a plurality of image sets by utilizing the first lens and the second lens, wherein each of the image sets comprises a first image corresponding to the first lens and a second image corresponding to the second lens, and the image sets comprise a reference image set including a first reference image corresponding to the first lens and a second reference image corresponding to the second lens;
a focusing module, controlling the focusing actuator to move the first lens and the second lens to a focusing position;
a defect detection module, detecting whether the reference image set is out of focus, wherein when at least one of the first reference image and the second reference image is out of focus, the defect detection module determines that the reference image set is out of focus;
a condition detection module, detecting a focusing condition of the image capturing device, wherein the focusing condition comprises a far focusing condition and a near focusing condition; and
a calibrating module, when the reference image set is detected to be out of focus and when a focusing condition of the image capturing device is a far focusing condition:
the calibrating module records a focusing step corresponding to a focused target in each of the image set, wherein the focusing step corresponding to the focused target in each of the image sets is a number of steps that the focusing actuator is required to move the first lens and the second lens to a focusing position to provide maximum clarity to a focused target in each of the image sets; and
when the focusing step corresponding to the focused target in each of the image sets reaches a convergent value, the calibrating module obtains a minimum focusing step calculates a difference value between the minimum focusing step and the convergent value, and calibrates the first focusing step to focusing distance ratio according to the difference value; and
when the reference image set is detected to be deformed and when a focusing condition of the image capturing device is a near focusing condition:
the calibrating module performs the three-dimensional depth estimation on each of the image sets to generate depth information of the focused target in each of the image sets, obtains the focusing distance corresponding to the focused target in each of the image sets according to each of the depth information, performs a regression according to the focusing distance and the focusing step corresponding to the focused target in each of the image sets, and calibrates the first focusing step-to-focusing distance ratio according to a result of the regression.

4. The image capturing device of claim 3, wherein the calibrating module further sets the focusing distance and the focusing step corresponding to the focused target in each of the image sets as a data point, categorizes the data points into a plurality of neighboring data groups according to the focusing distances, performs weighted average computation on the data points in each of the data groups to generate a weighted average data point corresponding to each of the neighboring data groups, and performs the regression on the weighted average data points.

5. A method for calibrating image defection, adapted to an image capturing device having a first lens, a second lens, a focusing actuator, and a pre-stored first focusing step-to-focusing distance ratio, comprising:
capturing a plurality of image sets by utilizing the first lens and the second lens, wherein each of the image sets comprises a first image corresponding to the first lens and a second image corresponding to the second lens, and wherein the step of capturing each of the image sets comprises utilizing the focusing actuator to move the first lens so as to provide maximum clarity to a focused target in each of the first images;
obtaining a focusing distance according to depth information of the focused target in each of the first images; and
calibrating the first focusing step-to-focusing distance ratio according to a focusing step and the focusing distance corresponding to the focused target in each of the first images, wherein the focusing step corresponding to the focused target in each of the first images is the number of steps that the focusing actuator moves the first lens to provide maximum clarity to the focused target in each of the first images;
wherein when a focusing condition of the image capturing device is a far focusing condition, the step of calibrating the first focusing step-to-focusing distance ratio comprising:
when the focusing step corresponding to the focused target in each of the first images reaches a convergent value, obtaining a minimum focusing step and calculating a difference value between the minimum focusing step and the convergent value; and
calibrating the first focusing step to focusing distance ratio according to the difference value; and
wherein when the focusing condition of the image capturing device is a near focusing condition, the step of calibrating the first focusing step-to-focusing distance ratio comprising:
performing a three-dimensional depth estimation on each of the image sets to generate depth information of the focused target in each of the first images;
obtaining the focusing distance corresponding to the focused target in each of the first images according to each of the depth information;
performing a regression according to the focusing distance and the focusing step corresponding to the focused target in each of the first images; and
calibrating the first focusing step-to-focusing distance ratio according to a result of the regression.

6. An image capturing device comprising:
a first lens;
a second lens;
a focusing actuator, coupled to the first lens and the second lens;
a storage unit, recording a plurality of modules and a first focusing step-to-focusing distance ratio; and
one or more processing units, coupled to the first lens, the second lens, the focusing actuator and the storage unit, and accessing and executing the modules recorded in the storage unit, wherein the modules comprise:
   an image capturing module, capturing a plurality of image sets by utilizing the first lens and the second lens, wherein each of the image sets comprises a first image corresponding to the first lens and a second image corresponding to the second lens;
   a focusing module, controlling the focusing actuator to move the first lens so as to provide maximum clarity to a focused target in each of the first images;
   a defect detection module, obtaining a focusing distance according to depth information of the focused target in each of the first images;
   a condition detection module, detecting a focusing condition of the image capturing device, wherein the focusing condition comprises a far focusing condition and a near focusing condition; and
   a calibrating module, calibrating the first focusing step-to-focusing distance ratio according to a focusing step and the focusing distance corresponding to the focused target in each of the first images, wherein the focusing step corresponding to the focused target in each of the first images is the number of steps that the focusing actuator moves the first lens to provide maximum clarity to the focused target in each of the first images,
   wherein when the focusing condition of the image capturing device is the far focusing condition, when the focusing step corresponding to the focused target in each of the first images reaches a convergent value, the calibrating module obtains a minimum focusing step, calculates a difference value between the minimum focusing step and the convergent value, and calibrates the first focusing step to focusing distance ratio according to the difference value, and
wherein when the focusing condition of the image capturing device is the near focusing condition, the calibrating module performs the three-dimensional depth estimation on each of the image sets to generate depth information of the focused target in each of the first images, obtains the focusing distance corresponding to the focused target in each of the first images according to each of the depth information, performs a regression according to the focusing distance and the focusing step corresponding to the focused target in each of the first images, and calibrates the first focusing step-to-focusing distance ratio according to a result of the regression.

* * * * *